UNITED STATES PATENT OFFICE.

RENÉ BOHN, OF LUDWIGSHAFEN-ON-THE-RHINE, BAVARIA, ASSIGNOR TO THE BADISCHE ANILIN AND SODA FABRIK, OF MANNHEIM, GERMANY.

ALIZARINE-GREEN SULPHO-ACID.

SPECIFICATION forming part of Letters Patent No. 401,635, dated April 16, 1889.

Application filed October 31, 1888. Serial No. 289,677. (Specimens.)

*To all whom it may concern:*

Be it known that I, RENÉ BOHN, a citizen of Switzerland, residing at Ludwigshafen-on-the-Rhine, in the Kingdom of Bavaria and Empire of Germany, have invented new and useful Improvements in the Manufacture of Alizarine-Green Sulpho-Acid, of which the following is a specification.

My invention relates to the manufacture of an improved dye-stuff or coloring-matter produced by the action of moderately-strong fuming sulphuric acid at an elevated temperature upon alizarine-green.

My improved dye-stuff or coloring-matter is termed "alizarine-green sulpho-acid," in order to indicate by this name both its chemical constitution and its general behavior, which correspond to those of a true and stable sulphonated derivative of alizarine-green.

In carrying out my invention I may employ alizarine-green either in its finished mercantile condition or in the state of its solution in sulphuric acid—such as results from the successive treatment of alizarine-blue with sulphuric anhydride and concentrated sulphuric acid in the process of preparing alizarine-green described in my former application for Letters Patent, filed on the 18th day of October, 1888, Serial No. 288,429.

The following is an example of the manner in which alizarine-green may be converted into its hereinbefore-named sulpho-derivative: About ten parts, by weight, of dry and finely-divided alizarine-green are gradually added to about two hundred parts, by weight, of fuming sulphuric acid containing about from eight to ten per cent. of free anhydride. Throughout this operation the mixture or solution thus prepared should be well agitated, and then its temperature is to be raised to about from 130° to about 135° centigrade, and maintained thereat for about four or five hours, or until a sample of the product has become practically soluble in water. This point being arrived at, the result of the operation is then poured into water, and the solution thus obtained is filtered and precipitated by the addition of common salt. The precipitate of the coloring-matter may afterward be collected upon a filter, pressed, and dried.

Alizarine-green sulpho-acid prepared as before described presents the following characteristic properties: In its solid state it has the appearance of a crystalline powder consisting of small needle-shaped crystals possessing a metallic luster. It is readily soluble in water. The aqueous solution has a bluish-green color, which changes into red upon the addition of mineral acids. Alkaline carbonates produce blue saline compounds, while caustic alkalies form green alkaline salts, which are not precipitated from their aqueous solutions by adding thereto an excess of caustic alkali.

Alizarine-green sulpho-acid resembles alizarine blue-green in its general aspect; but it may be readily distinguished from the same by its superior degree of solubility in water, and by the dingy-brown color of its solution in concentrated sulphuric acid, the corresponding solution of alizarine-blue-green exhibiting a bright-purple color. Fuming sulphuric acid containing about twenty-three per cent. of free anhydride dissolves alizarine-green sulpho-acid with a grass-green color, while the solution of alizarine-blue-green in the same solvent possesses a blue-green tint.

Alizarine-green sulpho-acid is readily converted by treatment with the bisulphites of potash, soda, or ammonia into bisulphite compounds, soluble in water and capable of being employed in dyeing and printing in a similar manner as the known analogous bisulphite compounds of alizarine-blue.

Alizarine-green sulpho-acid produces upon wool which has received a chrome mordant green shades similar to those of alizarine-green itself.

What I claim as new, and desire to secure by Letters Patent, is—

As a new product, the coloring-matter or dye-stuff (alizarine-green sulpho-acid) which is produced by the action of moderately-strong fuming sulphuric acid at an elevated temperature upon alizarine-green, and the chemical constitution and general behavior of which correspond to those of a true and stable sulphonated derivation of alizarine-green having the following characteristics: In its solid state it has the appearance of a crystalline powder consisting of small needle-shaped crystals possessing a metallic luster; its aqueous solution has a bluish-green color, which changes into red upon the addition of mineral acids; alkaline carbonates produce blue saline compounds, while with caustic alkalies it forms green alkaline salts which are not precipitated from their aqueous solutions by adding thereto an excess of caustic alkali; its solution in concentrated sulphuric acid has a dingy-brown color, and its solution in fuming suphuric acid containing about twenty-three per cent. of free anhydride has a grass-green color; upon chrome-mordanted wool it produces green shades.

In testimony whereof I have hereunto set my hand in the presence of two subscribing witnesses.

R. BOHN.

Witnesses:
H. FIRMANN,
HERM. HAUT.